United States Patent [19]

McMillen et al.

[11] 4,176,262
[45] Nov. 27, 1979

[54] AUTOMATIC FAIL-SAFE MECHANISM-OPERATED CELL SWITCH FOR METAL-CLAD SWITCHGEAR

[75] Inventors: James W. McMillen, Wilkins Township, Allegheny County; Anthony Tomeo, Penn Hills, both of Pa.

[73] Assignee: Westinghouse Electric Corp., Pittsburgh, Pa.

[21] Appl. No.: 806,396

[22] Filed: Jun. 14, 1977

[51] Int. Cl.² .............................................. H01H 9/20
[52] U.S. Cl. .............................................. 200/50 AA
[58] Field of Search .................. 200/50 AA; 561/335, 561/336, 337, 338

[56] References Cited

U.S. PATENT DOCUMENTS

| | | | |
|---|---|---|---|
| 2,443,669 | 6/1948 | Tusing | 200/50 AA |
| 2,618,682 | 11/1952 | Thumin | 200/50 AA X |
| 2,921,998 | 1/1960 | Pokorny et al. | 200/50 AA |
| 3,188,414 | 6/1965 | Boyden | 200/50 AA |
| 3,437,768 | 4/1969 | Miller et al. | 200/50 AA |
| 3,710,044 | 1/1973 | Sharp | 200/50 AA |
| 3,767,874 | 10/1973 | Wilson | 200/50 AA |
| 3,770,917 | 11/1973 | Tjebben | 200/50 AA |
| 3,793,493 | 2/1974 | Wilson | 200/50 AA |
| 4,002,864 | 1/1977 | Kuhn et al. | 200/50 AA |
| 4,002,865 | 1/1977 | Kuhn et al. | 200/50 AA |

OTHER PUBLICATIONS

Westinghouse Corp., "Instructions for Porcel-Line Metal-Clad Switchgear Type DH-P Housings Indoor and Outdoor"; I.B. 32-253 A; Sep. 1967.

*Primary Examiner*—James R. Scott
*Attorney, Agent, or Firm*—M. J. Moran

[57] ABSTRACT

A mechanism-operated cell switch (MOC) is provided for metal-clad switchgear. The cell switch actuates an auxiliary set of contacts for the main circuit interrupter. The main circuit interrupter may be disposed in two positions within the metal enclosed switchgear. In the first position it is connected to the high voltage terminals of the cell for external circuit protection. In the second position it is not connected to the high voltage terminals but nevertheless remains in the cell for test purposes. In either position the mechanism operated cell switch may be actuated in conjunction with the actuation of the main circuit interrupter. However, in the second or test position the mechanism operated cell switch may be bypassed if desired. Furthermore, when the main circuit interrupter has been moved into the first position an abutment on a pantograph mounted channel - which controls the MOC switch - is driven into a first operating position in which it stays even after the main circuit breaker has been subsequently moved to the test position, thus providing a fail-safe mode of operation. At this latter position, interlinkage between the circuit breaker and the channel for actuation of the MOC switch must be implemented manually thus providing a choice of operation.

5 Claims, 7 Drawing Figures

AUTOMATIC FAIL-SAFE MECHANISM-OPERATED CELL SWITCH FOR METAL-CLAD SWITCHGEAR

BACKGROUND OF THE INVENTION

1. Field of the Invention

The subject matter of this invention relates generally to auxiliary contact interlinkage mechanisms for circuit interrupter apparatus in metal-clad switchgear. The invention relates more particularly to fail-safe interlinkage apparatus.

2. Description of the Prior Art

Metal-clad switchgear for removable main circuit breakers is well known in the prior art. Examples of such switchgear may be found in the following U.S. Pat. Nos. 2,443,669, issued June 24, 1948 to R. S. Tusing; 2,921,998, issued Jan. 19, 1960 to Pokorny et al; 3,710,044, issued Jan. 9, 1973 to Sharp; 3,767,874, issued Oct. 23, 1973 to Wilson; 3,770,917, issued Nov. 6, 1973 to Tjebben; 3,793,493, issued Feb. 19, 1974 to Wilson, 4,002,864, issued Jan. 11, 1977 to Kuhn et al; and 4,002,865, issued Jan. 11, 1977 to Kuhn et al. All of the above patents teach metal enclosed or metal-clad switchgear apparatus for use with draw-out circuit breakers which may be levered into position or otherwise disposed in a metal-clad switchgear cabinet for operation. Usually a levering-in or racking-in device with associated and appropriate safety interlocks are taught. It is also known to utilize auxiliary contacts in association with the main interrupter contacts of metal-clad switchgear apparatus. The auxiliary contacts usually perform indicating or control functions and are not meant to carry the main load current, but are meant to open and close in some direct correspondence with the opening or closing of the main circuit interrupter contacts. In some cases the auxiliary contacts are opened and closed in direct conjunction with the opening and closing of the circuit interrupter contacts and in other cases they are not. In cases where the auxiliary contacts are mounted as part of the metal-clad cabinet rather than on the circuit interrupter itself it is necessary to provide an interlinkage between the circuit interrupter and the auxiliary contacts when auxiliary contact operation is desirable. Almost always it is desirous to actuate the auxiliary contacts when the main circuit breaker is in the operating position. In other instances it is sometimes desirous to operate the auxiliary contacts for test purposes. An example of the latter occurs when the circuit breaker apparatus is withdrawn away from the main high voltage terminals of the metal enclosed cabinet to a test position therein where opening and closing of the main contacts can be accomplished without affecting the external circuit which is connected from the main circuit breaker. Such an apparatus is shown in an instruction booklet entitled "Instructions for Porcel-Line Metal-Clad Switchgear Type DH-P Housings Indoor and Outdoor" identified by the reference symbol I.B. 32-253A effective September 1967. FIG. 23 of the latter booklet and the description on page 11 and 12 thereof given an adequate description of a prior art mechanism-operated cell switch (M.O.C. switch). In this case a pin on the circuit interrupter is disposed in a channel which is attached to a pantograph which in turn is connected by way of a long rod to the auxiliary contacts. As the circuit breaker is moved from the test position to the operating position and vice versa, the pin traverses the length of the channel always remaining in a position to move the channel and thus the pantograph and auxiliary contacts when the circuit breaker mechanism is operated. Furthermore, a refinement of the latter apparatus is shown in FIG. 1 of the present application in which one slidable two-position channel is disposed inside of the main channel. With such an apparatus the auxiliary contacts will always operate in conjunction with the operation of the main circuit interrupter when the main circuit interrupter is in the operating position. When the main circuit interrupter has been withdrawn to the test position the pin clears the channel and will not cause operation of the auxiliary contacts in conjunction with the operation of the main contacts unless the slidable channel is advanced forward to a second position in which case it recaptures the pin. Consequently, when the circuit breaker apparatus is in the test position operation of the auxiliary contacts is selectable. It is through that, the previously described apparatus represents the known extent of the prior art. However it presents a disadvantage, namely, one of safety. As the main circuit interrupter is levered into the operating position once again and then withdrawn to the test position a previous selection for the slidable channel may maintain the slidable channel in such position as to cause actuation of the auxiliary contacts when the main contacts are operated. This may not always be desirable on subsequent operations of the circuit breaker apparatus. Consequently, it would be highly desirable to provide a fail-safe feature wherein when the circuit breaker apparatus is levered in, the slidable channel would always be placed in a first operating position so that a subsequent removal or withdrawal of the circuit breaker apparatus to the test position will not cause actuation of the secondary contacts unless the selectable channel is then deliberately moved to the test position.

SUMMARY OF THE INVENTION

In accordance with the invention a circuit breaker interrupter apparatus is taught which includes a cabinet having spaced fixed terminals which are interconnected with an external circuit which is to be opened and closed in a controlled manner. A main circuit interrupter is provided within the cabinet for being moved between two positions, the first of which is an operating position where actuation of the main circuit interrupter contacts will control or affect the external circuit and the second of which is a test position where the circuit interrupter is disconnected from the contacts of the cabinet and where operation of the circuit interrupter will not affect the external circuit. The circuit interrupter has a pin on a lever on the side thereof which moves in a rotational arc in conjunction with the movement of the main circuit breaker contacts. Auxiliary contact means or a mechanism operated cell switch is provided on the cabinet. Furthermore, motion transfer support means are movably disposed within the cabinet such that the previously described pin or lever may interlink therewith when the circuit breaker is in the operating position, thus causing the auxiliary contacts to open and close in conjunction with the opening and closing of the circuit breaker main contacts. An extender means is provided on the motion transfer support means so that when the circuit breaker apparatus is levered out or otherwise withdrawn to the test position there will be no mechanical interlinkage between the auxiliary contacts and the main contacts unless the extender means is slid forward to recapture the lever. Finally, when the circuit breaker apparatus is levered into the operating position once again, an abutment on the extender means is forced by the pin to drive the extender means into its first position so that subsequent withdrawal of the main circuit breaker apparatus will free the previously described pin from the extender means and motion transfer support means so that a subsequent operation of the circuit interrupter in this position will not cause actuation of the auxiliary contact means unless the extender means is manually disposed into a position to capture the pin once again.

BRIEF DESCRIPTION OF THE DRAWINGS

For a better understanding of the invention reference may be had to the preferred embodiments thereof shown in the accompanying drawings in which.

DESCRIPTION OF THE PREFERRED EMBODIMENTS

Figure 1:
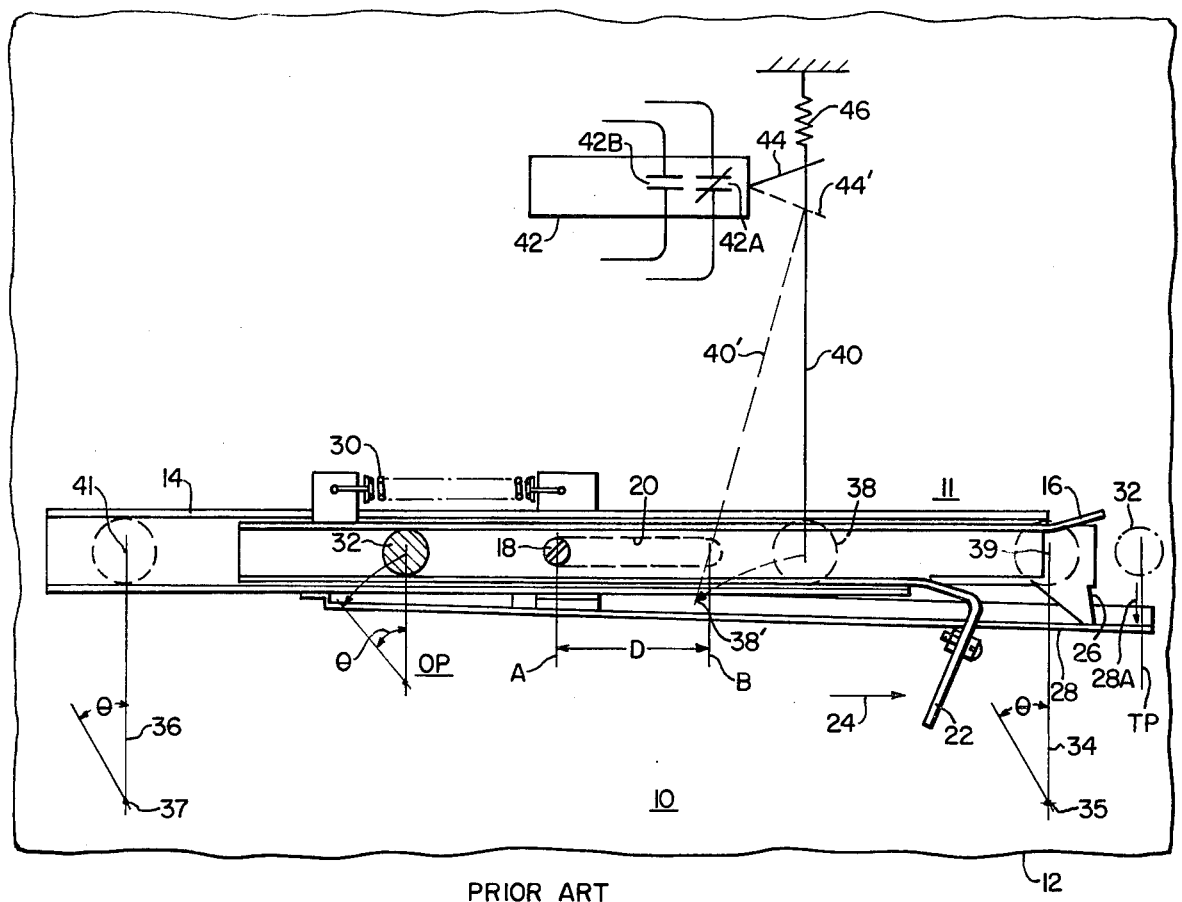
FIG. 1 shows a prior art switch channel-assembly and extender.

Referring now to the drawings and FIG. 1 in particular, a prior art auxiliary switch mechanism 10 is shown. The arrangement 10 is sometimes known as a mechanism-operated cell switch (M.O.C. switch) 10. An essential mechanical part of the M.O.C. switch 10 is a pantograph mechanism 11. The mechanism-operated cell switch or auxiliary switch 10 in the prior art is disposed or mounted on the inside of a side panel 12 of a metal-clad switchgear cabinet. The essential elements of the pantograph 11 include a support channel 14 in which is slidably disposed an extender channel 16. The extender channel 16 is relatively loosely secured to the support channel 14 by way of a securing device 18 which is free to move through a distance D in a cut-away portion 20 of the support channel 14. As shown in FIG. 1 the extender channel 16 is disposed as far to the left as the securing arrangement 18 allows. The channel 16 may be moved to the right by a distance D in the channel 14 by applying a force to the right, such as with a finger, on the downwardly extending tab 22. The force would be applied in the direction 24. Once the locking tab 26 of the extender channel 16 clears the end of the spring loaded locking bar 28 the spring 30 will cause the locking bar 28 to move upwardly as viewed in FIG. 1, thus maintaining channel 16 in a position extended to the right relative to that shown in FIG. 1. A circular pin 32 of a circuit breaker mechanism (not shown) is disposed in the extender channel 16. As viewed in FIG. 1 the pin is shown in an operating position OP. It is to be understood that if the circuit breaker mechanism is moved to the right as viewed in FIG. 1 which corresponds to a levering out of the circuit breaker mechanism, the pin 32 will assume a test position represented at TP in FIG. 1. This represents a test position for the circuit breaker in which the circuit breaker remains within the metal-clad circuit breaker cabinet but is electrically disconnected from the stationary high voltage contacts (not shown) of the cabinet. The pantograph 11 comprises the channel 14 supported movably on two generally equal support arms 34 and 36 which are pivotally secured to the side wall 12 at 35 and 37, respectively. In a like manner the channel 14 is pivotally supported at the other end of the pivotal levers 34 and 36 at 39 and 41 respectively. The latter arrangements are shown diagramatically for purposes of simplicity of illustration. Also disposed on the side wall 12 of the metal cabinet is an auxiliary switch 42. The auxiliary switch may comprise multiple contacts 42A and 42B which may be normally opened or normally closed. An actuating lever 44 is provided. When the actuating lever is in the upward position, the contacts 42A and 42B are each in a first state, and when the actuating lever 44 is in a second position 44' the state of each contacts 42A and 42B is reversed. Interconnected with the actuating lever 44 is an elongated interconnecting rod or link 40. When the interconnecting link 40 is shown in a nearly vertical position, the actuating lever 44 is in its uppermost position. A spring 46 is provided for biasing the actuating lever 44 to the upward position.

OPERATION OF THE PRIOR ART PANTOGRAPH

When the circuit breaker is in the operating position within the metal-clad cabinet which includes the side wall 12, the lever or pin 32 which is part of the circuit breaker is well disposed within the extender channel 16. As the circuit breaker contacts are moved to a closed position, for example, the pin or link 32 rotates downwardly through the angle $\theta$ thus causing the pantograph arrangement including the channels 16 and 14 and the pivotal lever arms 34 and 36 to move likewise through the angle $\theta$. When this happens, the fixed pivot 38 to which the interconnecting rod 40 is pivotally attached rotates downwardly to the position 38', thus changing the disposition of the connecting rod to that shown at 40'. This causes the actuating lever 44 to assume the position 44', causing the contacts 42A and 42B to change state. As the main circuit breaker contacts reopen, the pin 32 reverses direction through the arcs described by the angle $\theta$ and the pantograph reverses direction, thus allowing the contacts of the auxiliary switch 42 to change state by movement of the actuating lever 44 to its original position. If the circuit breaker is levered out or otherwise moved out of the cabinet 12, the direction will be to the right as viewed in FIG. 1. This will cause the pin 32 to disengage from the channel 16 as the pin 32 is moved to a horizontal position TP which corresponds to the circuit breaker being in the test position within the metal cabinet of the switchgear. In this case if the circuit breaker contacts are subsequently closed causing, the pin 32 moves through the arc $\theta$, the pin 32 will not cause the pantograph to follow. If it is desirous to have the auxiliary contacts 42A and 42B actuated when the circuit breaker is in the test position, the slidable channel 16 must be moved to the right by an amount D so that the pin 32 will once again be interlinked with the extender channel 16. When this happens the spring 30 is placed under a condition of tension and the locking bar 28 moves upwardly thus securing the channel 16 in the position shown thus preventing the tab 26 from moving to the left under the tension of the spring 30. In order to move the channel 16 back in the position shown in FIG. 1, the locking bar 28 would have to be depressed in the direction 28A to free the tab 26 to allow the channel 16 to be moved to the left by the tension force of the spring 30.

Figures 3, 4, 5:
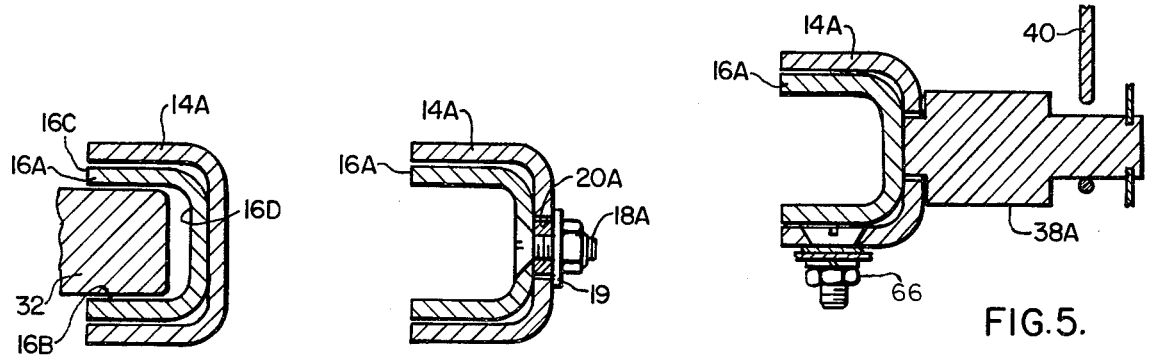
FIG. 3 shows a portion of the apparatus of FIG. 2 along the section lines III—III.
FIG. 4 shows a portion of the apparatus of FIG. 2 along the section lines IV—IV.
FIG. 5 shows a portion of the apparatus of FIG. 2 along the section lines V—V.

Referring now to FIGS. 2-6, the preferred embodiment of this invention is shown. In this case an auxiliary switch or mechanism operated cell switch (M.O.C. switch) arrangement 10' is shown. As was the case with respect to the prior art the central mechanical part of the switch arrangement 10' is a pantograph 11'. The pantograph 11' is pivotally secured to the inside wall of a side panel 12 of a metal-clad switchgear cabinet. In this case a motion transfer support or support channel 14A is provided in which is slidably disposed an extender channel 16A. The channel 16A is shown in its leftmost operable position in FIG. 2. A securing device 18A best shown in FIG. 4 is disposed in a cut-away portion 20A of the support channel 14A to allow the extender channel 16A to be moved through the distance D for purposes which will be described hereinafter. The extender channel 16A may be moved to the right as viewed in FIG. 1 by applying pressure or force in the direction 24 against a tab 22A. As was the case previously with respect to the prior art, the lever or pin portion 32 fits in the channel 16A. The center of the lever pin 32 is represented at 31. The arrangement of the lever pin 32 within the extender channel 16A and the support channel 14A is best shown in FIG. 3.

Figure 2:
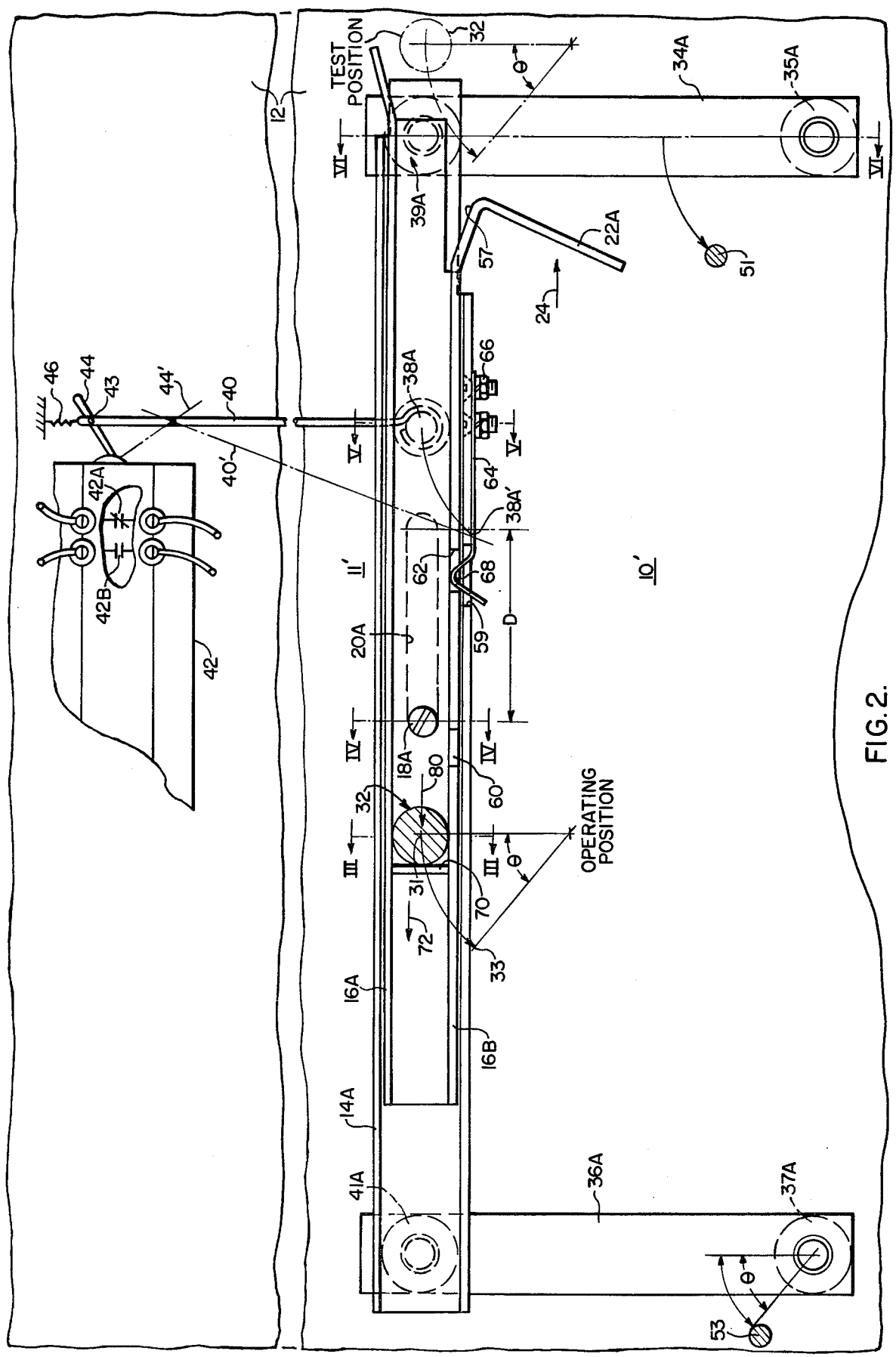
FIG. 2 shows the fail-safe channel-assembly and extender of the present invention in elevation, partially broken away and partially in section for a first operating position for the extender.
Figure 6:
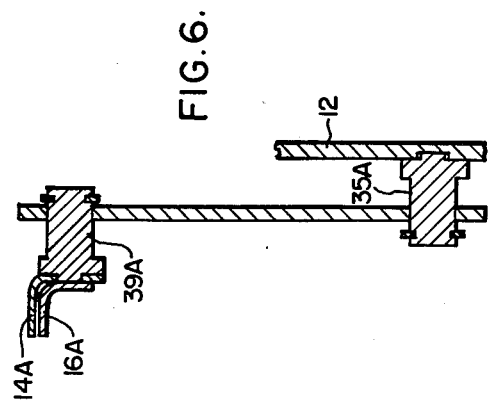
FIG. 6 shows a portion of the apparatus of FIG. 2 along the section lines VI—VI.

The support channel 14A is supported by pivotal support bars 34A and 36A which are pivotally interconnected with the channel 14A at the pivots 39A and 41A respectively. Likewise the support bars 34A and 36A are supported on the bottom thereof at the pivotal support bearing members 35A and 37A respectively. The arrangements for the rear or left-most support assembly shown to the left in FIG. 2 and the front or rightmost support assembly shown to the right in FIG. 2 are similar. The pivotal interconnecting arrangement between the pivot bearing 35A and the channel 14A is best shown in FIG. 6. The pivots 35A and 37A are both secured to the inside portion of the side wall 12 of the metal-clad switchgear. The auxiliary contact arrangement 42 is shown disposed against the side wall 12 of the switchgear cabinet. A cut-away portion thereof shows auxiliary contacts 42A and 42B which are closed and opened respectively. As was the case with respect to the prior art an actuating lever arm 44 which may assume an upper position and a lower position 44' is shown. The arm 44 is pivotally interconnected with an interconnecting driving rod 40 at the pivot pin 43. In the position shown in FIG. 2 when the circuit breaker apparatus (not shown) is in the operating position the pin or lever 32 may be driven through the angle θ from a first lever position represented at the center point 31 to a second angularly displaced position 33 as the circuit breaker main contacts are closed. This of course causes the channel arrangement including the channels 16A and 14A to move downwardly and to the left on the pivotal support members 34A and 36A through the angle θ towards the overtravel stops 51, 53 respectively. This causes the fixed connecting rod pivot assembly 38A to move downwardly to the position 38A' thus causing the connecting rod to assume the disposition shown at 40'. This in turn causes the actuator switch 44 to assume the position 44' which causes the contacts 42A and 42B to change state. Naturally, as was the case with the prior art, if the pin 32 is rotated backwardly in the opposite rotational direction from the position 33 to the position 31, the pantograph 11' will move upward and to the right about the pivot points 35A and 37A, thus allowing the connecting rod 40 and the contact actuating member 44 to assume the original positions. An opening or hole 59 is in the bottom of the support channel 14A. There are corresponding holes 60 and 62, which represent two discrete stable positions, in the extender channel 16A relative to the support channel 14A. There is also provided a spring 64 which is secured to the support channel 14A by a nut and bolt arrangement 66. A detent 68 in the spring 64 protrudes through the hole 59 into either the hole 62 or the hole 60 depending upon the position of the extender channel 16A. The flexibility of the spring 64 allows it to be depressed downwardly relative to the arrangement viewed in FIG. 2, as the channel 16A is changed from the stable position represented by hole 62 to the stable position represented by hole 60 and vice versa. There is transversely affixed in the channel 16A an abutting portion 70 against which the pin 32 may abut under certain operating conditions. When the circuit interrupter is in the operating position, with the separable main contacts thereof open, the lever 32 is in the position shown to the left in FIG. 2. As the circuit breaker contacts are closed, the pin 32 moves to the left and downwardly through the arc θ to the second position 33. This causes the entire channel arrangement or pantograph 11' to move leftwardly and downwardly such that the pivotal support arms 34A and 36A rotate to a position at stops 51 and 53. As shown in FIG. 2, the extender channel 16A is as far to the left as it is allowed to move by the interrelationship of the interlocking means 18A and the cutout 20A. When the circuit breaker apparatus is levered out or otherwise moved out to a TEST POSITION shown to the right in FIG. 2, the pin 32 is disconnected or unlinked from the channel 16A. Consequently, when the separable main contacts are closed and the link 32 rotates downwardly through the angle θ to the position 33, it will not cause the pantograph 11' to rotate correspondingly because there is no physical connection or interlinkage therebetween.

Referring to FIG. 3 it will be noted that the extender channel 16A comprises a U-shaped member having a lower horizontal portion 16B, an upper horizontal portion 16C and a vertical portion 16D which extends between the two previously described horizontal portions. As the lever portion or pin 32 is rotated downwardly, it exerts force against the top part of horizontal portion 16B, causing the pantograph to rotate downwardly. On the other hand, as the lever 32 is rotated upwardly, it exerts force on the bottom part of the upper horizontal portion 16C causing the pantograph to rotate upwardly. Of course as was mentioned previously, when the lever portion 32 is not in a disposition of interlinkage with the channel 16A such as is shown to the right in the TEST POSITION, in FIG. 2 the pantograph will not be moved by motion of the lever portion 32.

Referring once again to FIG. 2 specifically, it will be noted that in the TEST POSITION shown to the right, the main circuit breaker contacts may be opened and closed without causing a corresponding action in the auxiliary contacts 42. This is desirous in many test situations.

Figure 7:
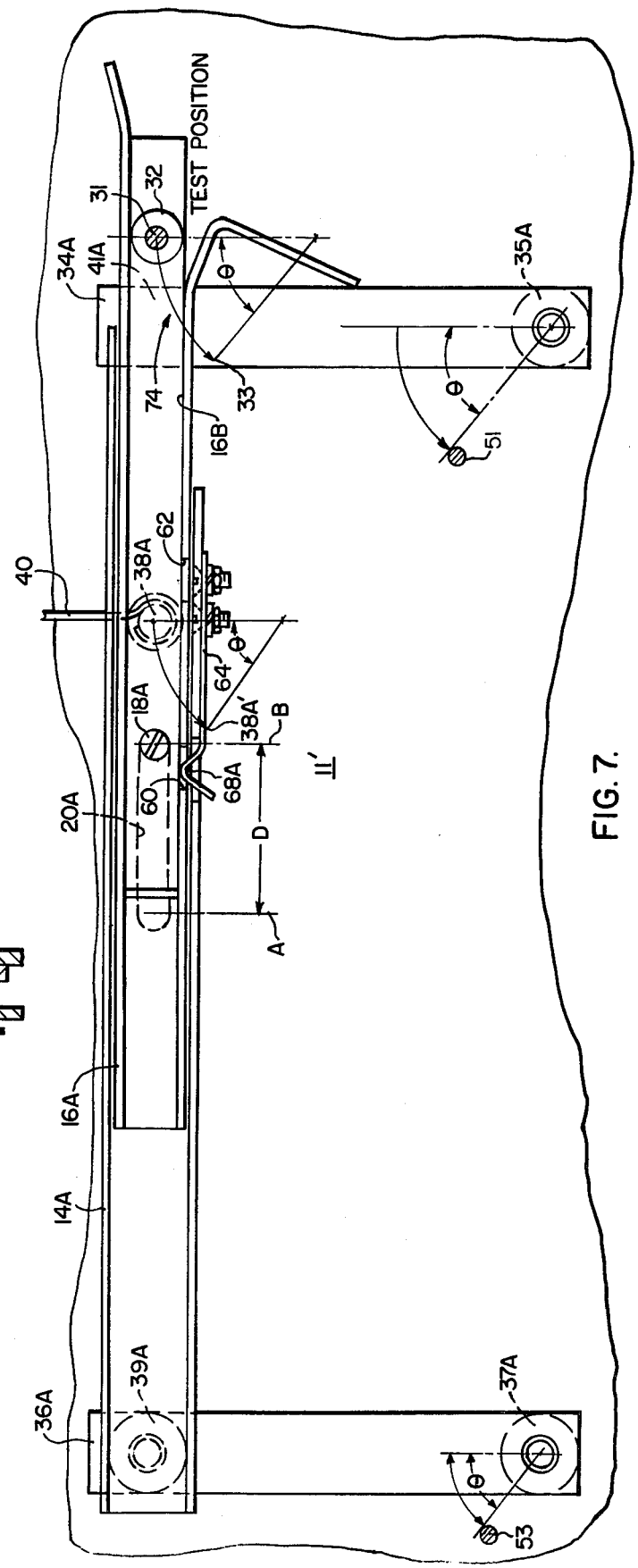
FIG. 7 shows the apparatus of FIG. 2 in a second operating position.

Referring now to FIG. 7 the disposition of the apparatus shown in FIG. 2 has been changed such that operation of the pin 32 as it moves angularly through the angle $\theta$ between the position 31 and the position 33 will cause the auxiliary contacts 42 (not shown in FIG. 7) to change state. In order for this to happen the extender means 16A has been moved to the right relative to its position in FIG. 2 by the distance D such that the extender channel 16A once again interlinks with the pin 32 even though the pin 32 is in a position which corresponds to the TEST POSITION of the main circuit breaker apparatus. In this case rotational movement of the pin 32 from the position 31 to the position 33 will cause the pantograph 11' to move through the angle $\theta$ as described previously, thus causing the interconnecting rod 40 to actuate the contact actuating member 44 shown in FIG. 2 to cause the contacts 42A and 42B to change state, as is shown in FIG. 2. This happens because the rotational path of the arc between the position 31 and the position 33 causes the linking member to abut against the bottom portion 16B of the extender channel 16A at a point 74, for example, thus causing the pantograph 11' to be driven downwardly and to the left as was described previously. It will be noted that in order to have the lever pin 32 interlinked with the extender means 16A, the extender means 16A has been moved to the right by a distance D. The interlocking means 18A is shown in a second slidable position represented at B. Consequently, the detent 68A in the spring 64 has been positioned in the hole 60 rather than in the hole 62 as was the case with respect to the arrangement of FIG. 2.

By referring to FIGS. 2 and 7 together, an important feature of the invention is shown. If the circuit breaker (not shown) is moved from the OPERATING POSITION to the TEST POSITION, the lever pin 32 will automatically become disconnected or unlinked with the extender channel 16A unless a positive action is taken to relink the extender channel 16A with the pin 32. This provides one feature of the invention, namely, once the circuit breaker has been levered or moved out to the TEST POSITION the auxiliary contacts (42 of FIG. 2) cannot be made to operate unless a conscious physical action is completed on the part of an operator, namely the action of moving the extender channel 16A to the right or in the direction 24 as viewed in FIG. 2 or FIG. 7. Furthermore, and this is the fail-safe feature of the invention, if the circuit breaker is levered or moved in to OPERATING POSITION with the circuit breaker in the main contact open position, the disposition of the abutting portion 70 is such that the pin 32 must drive it to the left or in the direction 72 as viewed in FIG. 2. This means that regardless of the original disposition of the extender means 16A, that is, in the non-extended position shown in FIG. 2 or in the extended position shown in FIG. 7, once the circuit breaker has been levered in, the extender 16A will always be driven to the non-extended position. Consequently, a subsequent levering out on the circuit breaker will free the pin 32 from the interlinkage 11', as was described previously, thus preventing inadvertent operation of the auxiliary contacts 42 when the circuit breaker is tested which, to repeat, is the fail-safe feature. Of course, this can be overridden by a positive physical action on the part of an operator or other maintenance personnel in which the extender 16A is manually moved out to interlink with the pin 32.

It is to be understood with respect to the embodiments of this invention that the physical dimensions are not limiting. The angle $\theta$ is chosen arbitrarily for purposes of illustration and is not limiting. The interlocking means 18A is illustrative and not limiting. The channel arrangements 16A and 14A are not limiting. It is also to be understood that the number of contacts 42A and 42B for example may be any convenient number. It is also to be understood that the presence of the biasing spring 46 is not limiting and that another spring action may be provided or no spring action if that is desirable.

The apparatus taught with respect to the embodiments of this invention has many advantages. One advantage lies in the fail-safe nature of its operation. The extender channel 16A will always be in the non-extended position after the circuit breaker has been levered in and will not be in an extended position thereafter, even if the circuit breaker has been subsequently levered out, unless a positive physical action is taken on the part of the operator to move the channel 16A out. This is considered an important fail-safe feature. In addition, another advantage lies in the fact that the slidable nature of the extender channel with regard to the support channel allows an operator to choose whether the auxiliary contacts are to be operated or not when the main contacts are open or closed when the circuit breaker is in the TEST POSITION.

What we claim as our invention is:

1. Circuit interrupter apparatus, comprising:
   (a) a cabinet having spaced fixed terminals which are interconnected with a circuit which is to be opened and closed in a controlled manner;
   (b) main circuit interrupter means movable between an operating position and a test position within said cabinet, said main circuit interrupter means being interconnected electrically with said fixed terminals when in said operating position to thus open and close said circuit as the separable main contacts of said main circuit interrupter means are opened and closed respectively, said main circuit interrupter means being disconnected electrically from said fixed terminals when in said test position, said main circuit interrupter means having a lever means which moves in response to the operation of said separable main contacts between a first lever position when said separable main contacts are opened and a second lever position when said separable main contacts are closed;
   (c) auxiliary contact means disposed within said cabinet, said auxiliary contact means having a contact actuating member;
   (d) motion transfer support means movably disposed within said cabinet means, said motion transfer support means being interconnected with said auxiliary contact actuating member for moving said actuating member; and
   (e) extender means slidably disposed upon said motion transfer support means in either of a first or second slidable position, said extender means being in said first slidable position and in a disposition of mechanical interlinkage with said lever means when said main circuit interrupter means is in said operating position to thus cause said auxiliary contact means to be actuated to change state as said lever means is moved between said first and said second lever positions, said extender means remaining in said first slidable position and not in a disposition of mechanical interlinkage with said lever means when said main circuit interrupter means is in said test position unless said extender means has been manually moved to said second slidable position in which case it becomes mechanically interlinked with said lever means to thus cause said auxiliary contact means to be actuated to change state as said lever is moved between said first and said second lever means positions, said extender means always being driven to said first slidable position by said lever means as said main circuit interrupter is moved to said operating position.

2. The combination as claimed in claim 1 wherein said extender means comprises an extender channel member having an upper horizontally oriented portion, a lower horizontally oriented portion and a vertically oriented portion, said lever means comprises a lever means portion which is movably disposed in said channel member when said extender means and said lever means are in said disposition of interlinkage, an abutting portion disposed transversely in said channel member to cause said lever means to abut thereagainst to thus drive said extender means to said first slidable position as said main circuit interrupter is driven to said operating position.

3. The combination as claimed in claim 2 wherein said motion transfer support means comprises a support channel member in which said extender channel member is slidably disposed.

4. The combination as claimed in claim 3 wherein said support channel member is disposed as a portion of a pantograph.

5. The combination as claimed in claim 1 wherein said cabinet is metal.

* * * * *